US012802599B2

(12) United States Patent
Jeong et al.

(10) Patent No.: US 12,802,599 B2
(45) Date of Patent: Nov. 17, 2026

(54) DISPLAY DEVICE HAVING PANEL DEFECT NORMALIZER, INSPECTION METHOD OF THE SAME, AND ELECTRONIC DEVICE INCLUDING THE SAME

(71) Applicant: Samsung Display Co., Ltd., Yongin-si (KR)

(72) Inventors: Ji-Woong Jeong, Yongin-si (KR); Boyoung An, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/277,143

(22) Filed: Jul. 22, 2025

(65) Prior Publication Data

US 2026/0065821 A1 Mar. 5, 2026

(30) Foreign Application Priority Data

Sep. 4, 2024 (KR) ........................ 10-2024-0119689

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2300/043* (2013.01); *G09G 2330/10* (2013.01); *G09G 2330/12* (2013.01)

(58) Field of Classification Search
CPC ......... G09G 2300/043; G09G 2330/10; G09G 2330/12; G09G 3/006; G09G 3/32; G09G 3/3291; H04N 17/002; H04N 25/683; G06T 7/0002
See application file for complete search history.

(56) References Cited

U.S. PATENT DOCUMENTS

| | | | | |
|---|---|---|---|---|
| 11,589,035 | B1 * | 2/2023 | Lin | G06T 7/0002 |
| 2010/0066871 | A1 * | 3/2010 | Atanassov | H04N 25/683 348/E9.037 |
| 2022/0366857 | A1 * | 11/2022 | An | G09G 3/3291 |
| 2023/0047875 | A1 * | 2/2023 | An | G09G 3/32 |
| 2025/0126368 | A1 * | 4/2025 | Kim | H04N 17/002 |
| 2025/0378797 | A1 * | 12/2025 | Yang | G09G 3/3291 |

FOREIGN PATENT DOCUMENTS

KR 10-1179247 B1 9/2012

OTHER PUBLICATIONS

Feng, Xuehuan, et al., “A Novel Algorithm for Eliminating Abnormal Detection Data of Ultra-Large 95inch 8K OLED Panels with External Compensation,” Society for Information Display (SID), 2023, 3 pages.

* cited by examiner

*Primary Examiner* — Richard J Hong
(74) *Attorney, Agent, or Firm* — Womble Bond Dickinson (US) LLP

(57) ABSTRACT

A display device includes: a display panel including a plurality of pixels; a sensing circuit to generate sensing values of the plurality of pixels by sensing characteristics of the plurality of pixels; and a panel defect normalizer to compensate for the sensing values, the panel defect normalizer including: a preliminary defective pixel detector to detect a preliminary defective pixel; a defective pixel detector to detect a defective pixel; a defective line detector to detect a defective line; a defective line compensator to compensate for a sensing value of the defective line; and a defective pixel compensator to compensate for a sensing value of the defective pixel.

20 Claims, 12 Drawing Sheets

DISPLAY DEVICE HAVING PANEL DEFECT NORMALIZER, INSPECTION METHOD OF THE SAME, AND ELECTRONIC DEVICE INCLUDING THE SAME

CROSS-REFERENCE TO RELATED APPLICATION

The present application claims priority to and the benefit of Korean Patent Application No. 10-2024-0119689, filed on Sep. 4, 2024, in the Korean Intellectual Property Office, the entire disclosure of which is incorporated by reference herein.

BACKGROUND

1. Field

Aspects of embodiments of the present disclosure relate to a display device that may sense characteristics of pixels, an inspection method of the display device, and an electronic device including the display device.

2. Description of the Related Art

In a manufacturing process of a display device, characteristics of pixels may be sensed, and defects of the display device may be detected based on sensing values of the pixels. The defects of the display device may include a line defect corresponding to a defect of a pixel column or a pixel row including pixels arranged in one direction, and a point defect corresponding to a defect of one pixel.

The above information disclosed in this Background section is for enhancement of understanding of the background of the present disclosure, and therefore, it may contain information that does not constitute prior art.

SUMMARY

When only a line defect is detected in a manufacturing process of a display device, a manufacturing time of the display device may be reduced, but a point defect may occur in the display device. As such, a yield of the display device may be reduced. When the point defects for all pixels are detected in the manufacturing process of the display device, the yield of the display device may be increased, but the manufacturing time of the display device may also be increased.

Embodiments of the present disclosure may be directed to a display device having an increased yield and a reduced manufacturing time, an inspection method of the display device, and an electronic device including the display device.

According to one or more embodiments of the present disclosure, a display device includes: a display panel including a plurality of pixels; a sensing circuit configured to generate sensing values of the plurality of pixels by sensing characteristics of the plurality of pixels; and a panel defect normalizer configured to compensate for the sensing values, the panel defect normalizer including: a preliminary defective pixel detector configured to detect a preliminary defective pixel by comparing a sensing value of a target pixel with a sensing value of an adjacent pixel adjacent to the target pixel in a first direction; a defective pixel detector configured to detect a defective pixel by comparing a sensing value of the preliminary defective pixel with sensing values of peripheral pixels surrounding around the preliminary defective pixel; a defective line detector configured to detect a defective line by counting a number of preliminary defective pixels included in a line extending in a second direction crossing the first direction; a defective line compensator configured to compensate for a sensing value of the defective line; and a defective pixel compensator configured to compensate for a sensing value of the defective pixel.

In an embodiment, the preliminary defective pixel detector may be configured to determine the target pixel as the preliminary defective pixel when a difference between the sensing value of the target pixel and the sensing value of the adjacent pixel is greater than a threshold value.

In an embodiment, the defective pixel detector may include a first defective pixel detector configured to determine the preliminary defective pixel as the defective pixel when: a difference between a maximum value of total sensing values including central sensing values, which may be sensing values of sub-pixels of the preliminary defective pixel, and peripheral sensing values, which may be sensing values of sub-pixels of the peripheral pixel, and a minimum value of the total sensing values is greater than a first threshold value; a difference between a median value of the total sensing values and the minimum value of the total sensing values is less than a second threshold value; a difference between a median value of the peripheral sensing values and a median value of the central sensing values is greater than a third threshold value; the maximum value of the total sensing values is less than a fourth threshold value; and the minimum value of the total sensing values is greater than a fifth threshold value.

In an embodiment, the defective pixel detector may include a second defective pixel detector configured to determine the preliminary defective pixel as the defective pixel when a value obtained by subtracting a median value of peripheral sensing values, which may be sensing values of sub-pixels of the peripheral pixels, from a minimum value of central sensing values, which may be sensing values of sub-pixels of the preliminary defective pixel, is greater than a threshold value.

In an embodiment, the defective pixel detector may include a third defective pixel detector configured to determine the preliminary defective pixel as the defective pixel when a value obtained by subtracting a maximum value of central sensing values, which may be sensing values of sub-pixels of the preliminary defective pixel, from a median value of peripheral sensing values, which may be sensing values of sub-pixels of the peripheral pixels, is greater than a threshold value.

In an embodiment, the defective line detector may be configured to determine the line as the defective line when the number of the preliminary defective pixels included in the line is greater than a threshold value.

In an embodiment, the defective line compensator may be configured to replace the sensing value of the defective line with an average value of sensing values of adjacent lines adjacent to the defective line in the first direction.

In an embodiment, the defective pixel compensator may be configured to replace the sensing value of the defective pixel with an average value of sensing values of peripheral pixels surrounding around the defective pixel.

In an embodiment, the panel defect normalizer may further include a defect storage configured to store a position of the preliminary defective pixel, a position of the defective line, and a position of the defective pixel.

In an embodiment, the panel defect normalizer may further include a defect distinguisher configured to distinguish an in-line defective pixel included in the defective line from an out-line defective pixel not included in the defective line based on the position of the defective line and the position of the defective pixel.

In an embodiment, the defective pixel compensator may be configured to not compensate for a sensing value of the in-line defective pixel.

In an embodiment, the characteristics of the plurality of pixels may be one of threshold voltages of driving transistors included in the plurality of pixels, electron mobilities of the driving transistors, and degradations of light-emitting elements included in the plurality of pixels.

According to one or more embodiments of the present disclosure, an inspection method of a display device, includes: detecting a preliminary defective pixel by comparing a sensing value of a target pixel with a sensing value of an adjacent pixel adjacent to the target pixel in a first direction; detecting a defective pixel by comparing a sensing value of the preliminary defective pixel with sensing values of peripheral pixels surrounding around the preliminary defective pixel; detecting a defective line by counting a number of preliminary defective pixels included in a line extending in a second direction crossing the first direction; compensating for a sensing value of the defective line; and compensating for a sensing value of the defective pixel.

In an embodiment, the detecting of the preliminary defective pixel may include determining the target pixel as the preliminary defective pixel when a difference between the sensing value of the target pixel and the sensing value of the adjacent pixel is greater than a threshold value.

In an embodiment, the detecting of the defective pixel may include determining the preliminary defective pixel as the defective pixel when: a difference between a maximum value of total sensing values including central sensing values, which may be sensing values of sub-pixels of the preliminary defective pixel, and peripheral sensing values, which may be sensing values of sub-pixels of the peripheral pixel, and a minimum value of the total sensing values is greater than a first threshold value; a difference between a median value of the total sensing values and the minimum value of the total sensing values is less than a second threshold value; a difference between a median value of the peripheral sensing values and a median value of the central sensing values is greater than a third threshold value; the maximum value of the total sensing values is less than a fourth threshold value; and the minimum value of the total sensing values is greater than a fifth threshold value.

In an embodiment, the detecting of the defective pixel may include determining the preliminary defective pixel as the defective pixel when a value obtained by subtracting a median value of peripheral sensing values, which may be sensing values of sub-pixels of the peripheral pixels, from a minimum value of central sensing values, which may be sensing values of sub-pixels of the preliminary defective pixel, is greater than a threshold value.

In an embodiment, the detecting of the defective pixel may include determining the preliminary defective pixel as the defective pixel when a value obtained by subtracting a maximum value of central sensing values, which may be sensing values of sub-pixels of the preliminary defective pixel, from a median value of peripheral sensing values, which may be sensing values of sub-pixels of the peripheral pixels, is greater than a threshold value.

In an embodiment, the detecting of the defective line may include determining the line as the defective line when the number of the preliminary defective pixels included in the line is greater than a threshold value.

In an embodiment, the compensating for the sensing value of the defective line may include replacing the sensing value of the defective line with an average value of sensing values of adjacent lines adjacent to the defective line in the first direction.

According to one or more embodiments of the present disclosure, an electronic device includes: a processor configured to generate image data; a display device configured to display an image based on the image data; and a power module connected to the processor and the display device. The display device includes: a display panel including a plurality of pixels; a sensing circuit configured to generate sensing values of the plurality of pixels by sensing characteristics of the plurality of pixels; and a panel defect normalizer configured to compensate for the sensing values. The panel defect normalizer includes: a preliminary defective pixel detector configured to detect a preliminary defective pixel by comparing a sensing value of a target pixel with a sensing value of an adjacent pixel adjacent to the target pixel in a first direction; a defective pixel detector configured to detect a defective pixel by comparing a sensing value of the preliminary defective pixel with sensing values of peripheral pixels surrounding around the preliminary defective pixel; a defective line detector configured to detect a defective line by counting a number of preliminary defective pixels included in a line extending in a second direction crossing the first direction; a defective line compensator configured to compensate for a sensing value of the defective line; and a defective pixel compensator configured to compensate for a sensing value of the defective pixel.

According to some embodiments of the present disclosure, a defective pixel may be detected from (e.g., from only) a preliminary defective pixel that is detected for detecting a defective line, so that a yield of the display device may be increased, and a manufacturing time of the display device may be reduced.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
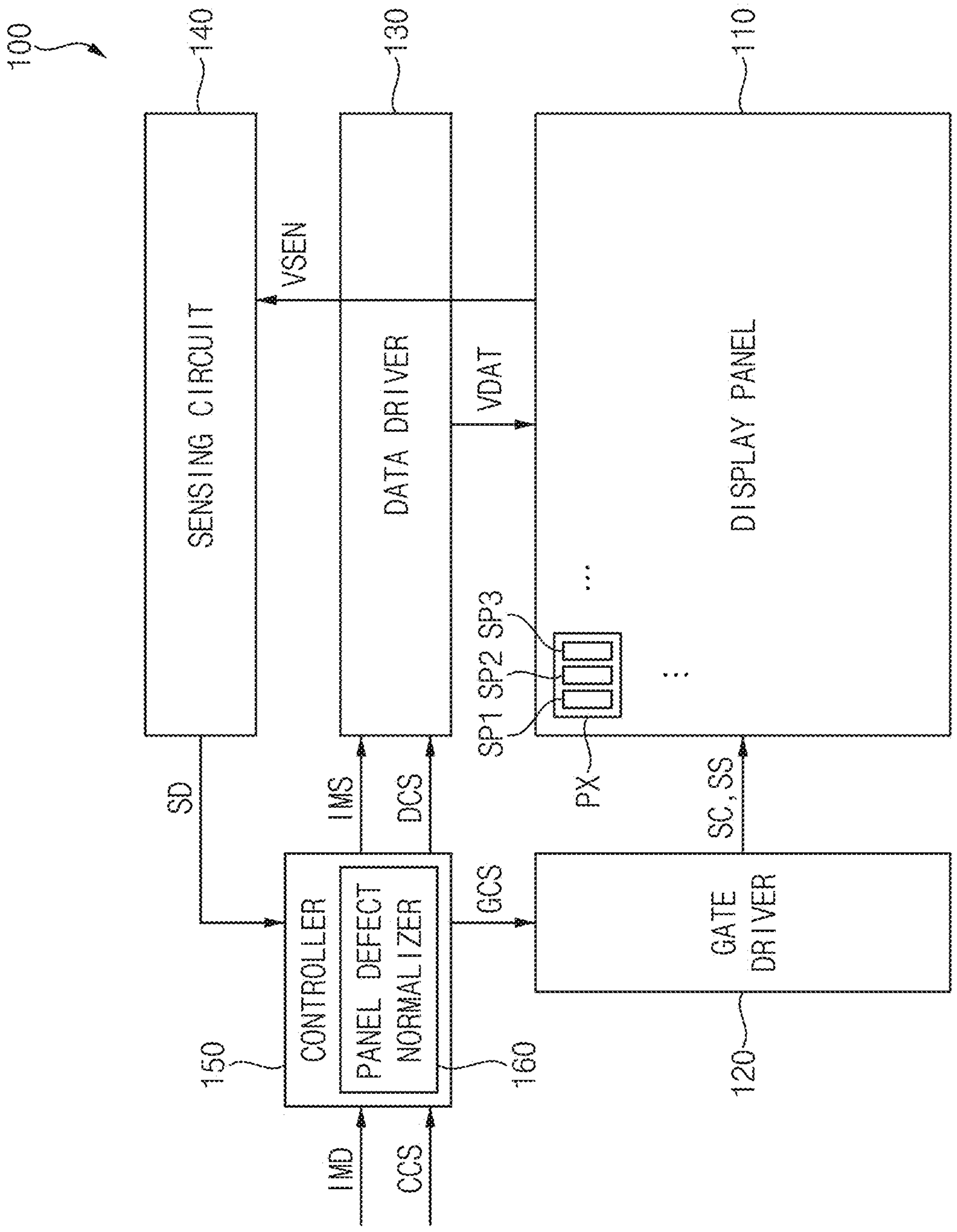
FIG. 1 is a block diagram illustrating a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the FIGURES. It will be understood that the spatially relative terms are intended to encompass different orientations of the device in use or in operation, in addition to the orientation depicted in the FIGURES. For example, if the device in the FIGURES is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the FIGURES may vary in practice depending, for example, on tolerances and/or manufacturing techniques. Accordingly, the embodiments of the present disclosure should not be construed as being limited to the specific shapes shown in the FIGURES, and should be construed considering changes in shapes that may occur, for example, as a result of manufacturing. As such, the shapes shown in the drawings may not depict the actual shapes of areas of the device, and the present disclosure is not limited thereto.

In the FIGURES, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
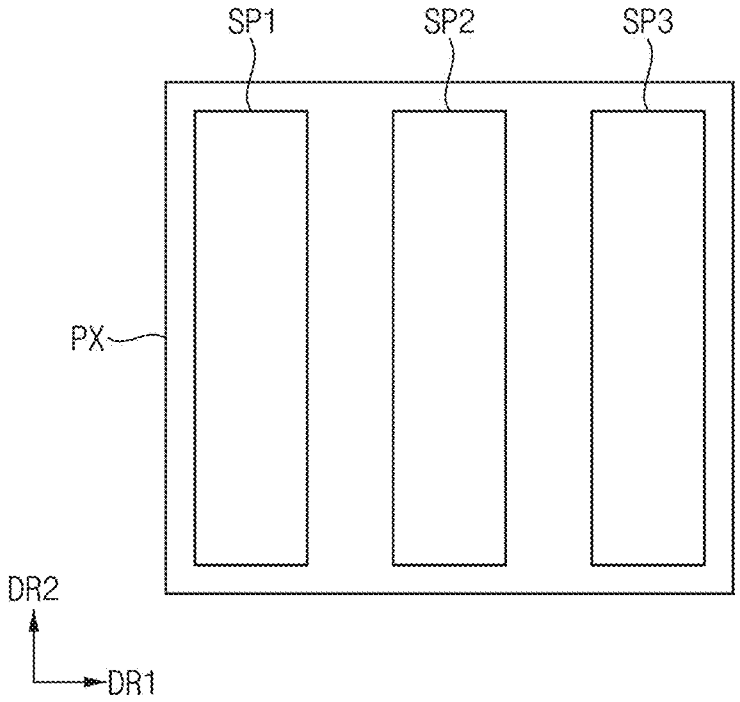
FIG. 2A is a diagram illustrating a pixel of FIG. 1.
Figure 2B:
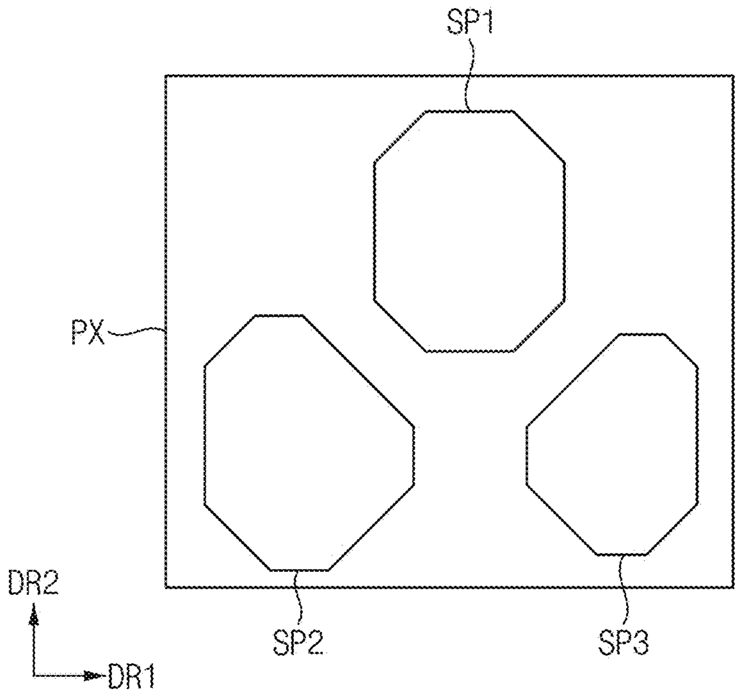
FIG. 2B is a diagram illustrating a pixel of FIG. 1.

FIG. 1 is a block diagram illustrating a display device 100 according to an embodiment. FIG. 2A is a diagram illustrating a pixel PX of FIG. 1. FIG. 2B is a diagram illustrating the pixel PX of FIG. 1.

Referring to FIG. 1, a display device 100 may include a display panel 110, a gate driver 120, a data driver 130, a sensing circuit 140, a controller 150, and a panel defect normalizer 160.

The display panel 110 may include a plurality of pixels PX. Each pixel PX may include a plurality of sub-pixels. The sub-pixels may display different colors from each other, and the pixel PX may display a color (e.g., one color) that is a combination of the colors displayed by the corresponding sub-pixels.

In an embodiment, the pixel PX may include a first sub-pixel SP1, a second sub-pixel SP2, and a third sub-pixel SP3. However, the present disclosure is not limited thereto, and in an embodiment, the pixel PX may include two, four, or more sub-pixels.

In an embodiment, the first sub-pixel SP1, the second sub-pixel SP2, and the third sub-pixel SP3 may be a red sub-pixel, a green sub-pixel, and a blue sub-pixel, respectively. However, the present disclosure is not limited thereto, and in an embodiment, the first sub-pixel SP1, the second sub-pixel SP2, and the third sub-pixel SP3 may be a magenta sub-pixel, a yellow sub-pixel, and a cyan sub-pixel, respectively.

In an embodiment, as illustrated in FIG. 2A, the first sub-pixel SP1, the second sub-pixel SP2, and the third sub-pixel SP3 may be arranged along a first direction DR1 within the pixel PX. The arrangement of the sub-pixels SP1, SP2, and SP3 illustrated in FIG. 2A may be referred to as an H-stripe arrangement. In an embodiment, as illustrated in FIG. 2B, within the pixel PX, the first sub-pixel SP1 may be arranged at a top center, the second sub-pixel SP2 may be arranged at a bottom left, and the third sub-pixel SP3 may be arranged at a bottom right. The arrangement of the sub-pixels SP1, SP2, and SP3 illustrated in FIG. 2B may be referred to as a Q-stripe arrangement. Hereinafter, the sub-pixels SP1, SP2, and SP3 will be described in more detail as being arranged in the H-stripe arrangement as a representative example.

The gate driver 120 may provide a scan signal SC and a sensing signal SS to the sub-pixel. The gate driver 120 may generate the scan signal SC and the sensing signal SS based on a gate control signal GCS. The gate control signal GCS may include a gate start signal, a gate clock signal, and the like. In an embodiment, the gate driver 120 may be mounted in a peripheral area of the display panel 110.

The data driver 130 may provide a data voltage VDAT to the sub-pixel. The data driver 130 may generate the data voltage VDAT based on an image signal IMS and a data control signal DCS. The data driver 130 may convert the image signal IMS, which may be in a digital form, into the data voltage VDAT in an analog form. The data control signal DCS may include a load signal, a data clock signal, and the like.

The sensing circuit 140 may sense characteristics of the pixels PX to generate sensing values of the pixels PX. The sensing circuit 140 may receive sensing voltages VSEN including information about the characteristics of the pixels PX, and may generate sensing data SD including the sensing values corresponding to the sensing voltages VSEN. In an embodiment, the data driver 130 and the sensing circuit 140 may be implemented together as a single integrated circuit, or as separate integrated circuits.

The controller 150 may control an operation of the gate driver 120, an operation of the data driver 130, and an operation of the sensing circuit 140. The controller 150 may provide the gate control signal GCS to the gate driver 120, and may provide the image signal IMS and the data control signal DCS to the data driver 130. The controller 150 may generate the image signal IMS based on image data IMD. The controller 150 may generate the gate control signal GCS and the data control signal DCS based on a controller control signal CCS. The controller control signal CCS may include a horizontal synchronization signal, a vertical synchronization signal, a master clock signal, a data enable signal, and the like. In an embodiment, the data driver 130 and the controller 150 may be implemented together as a single integrated circuit (e.g., a timing controller embedded data driver (TED)), or as separate integrated circuits.

The panel defect normalizer 160 may compensate for the sensing values included in the sensing data SD. The panel defect normalizer 160 may detect a defective line and a defective pixel from the sensing values, and may compensate for a sensing value of the defective line and a sensing value of the defective pixel. In an embodiment, the controller 150 may include the panel defect normalizer 160. In another embodiment, the panel defect normalizer 160 may be implemented as a separate integrated circuit from that of the controller 150.

Figure 3:
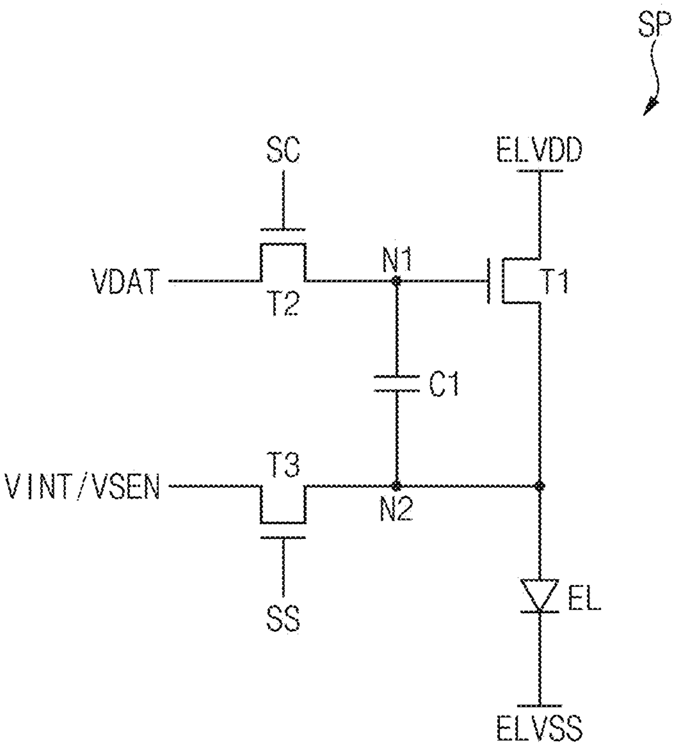
FIG. 3 is a circuit diagram illustrating a sub-pixel of FIG. 1.

FIG. 3 is a circuit diagram illustrating a sub-pixel SP of FIG. 1. FIG. 3 illustrates one of the first sub-pixel SP1, the second sub-pixel SP2, and/or the third sub-pixel SP3 of FIG. 1.

Referring to FIG. 3, the sub-pixel SP may receive the scan signal SC, the sensing signal SS, the data voltage VDAT, a first power voltage ELVDD, and a second power voltage ELVSS. The sub-pixel SP may emit light having a luminance corresponding to the data voltage VDAT. Further, the sub-pixel SP may output a sensing voltage VSEN. In an embodiment, a voltage level of the second power voltage ELVSS may be lower than a voltage level of the first power voltage ELVDD. The sub-pixel SP may include a light-emitting element EL, a first transistor T1, a second transistor T2, a third transistor T3, and a first capacitor C1.

The light-emitting element EL may emit light having a luminance corresponding to a driving current. The light-emitting element EL may include an anode connected to a second node N2, and a cathode that receives the second power voltage ELVSS. In an embodiment, the light-emitting element EL may be an organic light-emitting diode, an inorganic light-emitting diode, a micro light-emitting diode, or a quantum dot light-emitting diode.

The first transistor T1 may generate the driving current corresponding to the data voltage VDATA. The first transistor T1 may include a gate connected to a first node N1, a first terminal (e.g., a drain) that receives the first power voltage ELVDD, and a second terminal (e.g., a source) connected to the second node N2. The first transistor T1 may be referred to as a driving transistor.

The second transistor T2 may transmit the data voltage VDAT to the first node N1 in response to the scan signal SC. The second transistor T2 may include a gate that receives the scan signal SC, a first terminal (e.g., a drain) that receives the data voltage VDAT, and a second terminal (e.g., a source) connected to the first node N1. The second transistor T2 may be referred to as a scan transistor or a write transistor.

The third transistor T3 may transmit an initialization voltage VINT to the second node N2 in response to the sensing signal SS. Further, the third transistor T3 may output a voltage of the second node N2 as the sensing voltage VSEN in response to the sensing signal SS. The third transistor T3 may include a gate that receives the sensing signal SS, a first terminal (e.g., a drain) that receives the initialization voltage VINT or outputs the sensing voltage VSEN, and a second terminal (e.g., a source) connected to the second node N2. The third transistor T3 may be referred to as a sensing transistor or an initialization transistor.

The sensing voltage VSEN may include information about a characteristic of the sub-pixel SP. In an embodiment, the characteristic of the sub-pixel SP may be one of a threshold voltage of the first transistor T1, an electron mobility of the first transistor T1, and/or a degradation of the light-emitting element EL.

In an embodiment, each of the first transistor T1, the second transistor T2, and the third transistor T3 may be an n-channel metal oxide semiconductor (NMOS) transistor. In an embodiment, each of the first transistor T1, the second transistor T2, and the third transistor T3 may be an oxide semiconductor transistor.

The first capacitor C1 may store the data voltage VDAT. The first capacitor C1 may include a first terminal connected to the first node N1, and a second terminal connected to the second node N2. The first capacitor C1 may be referred to as a storage capacitor.

Figure 4:
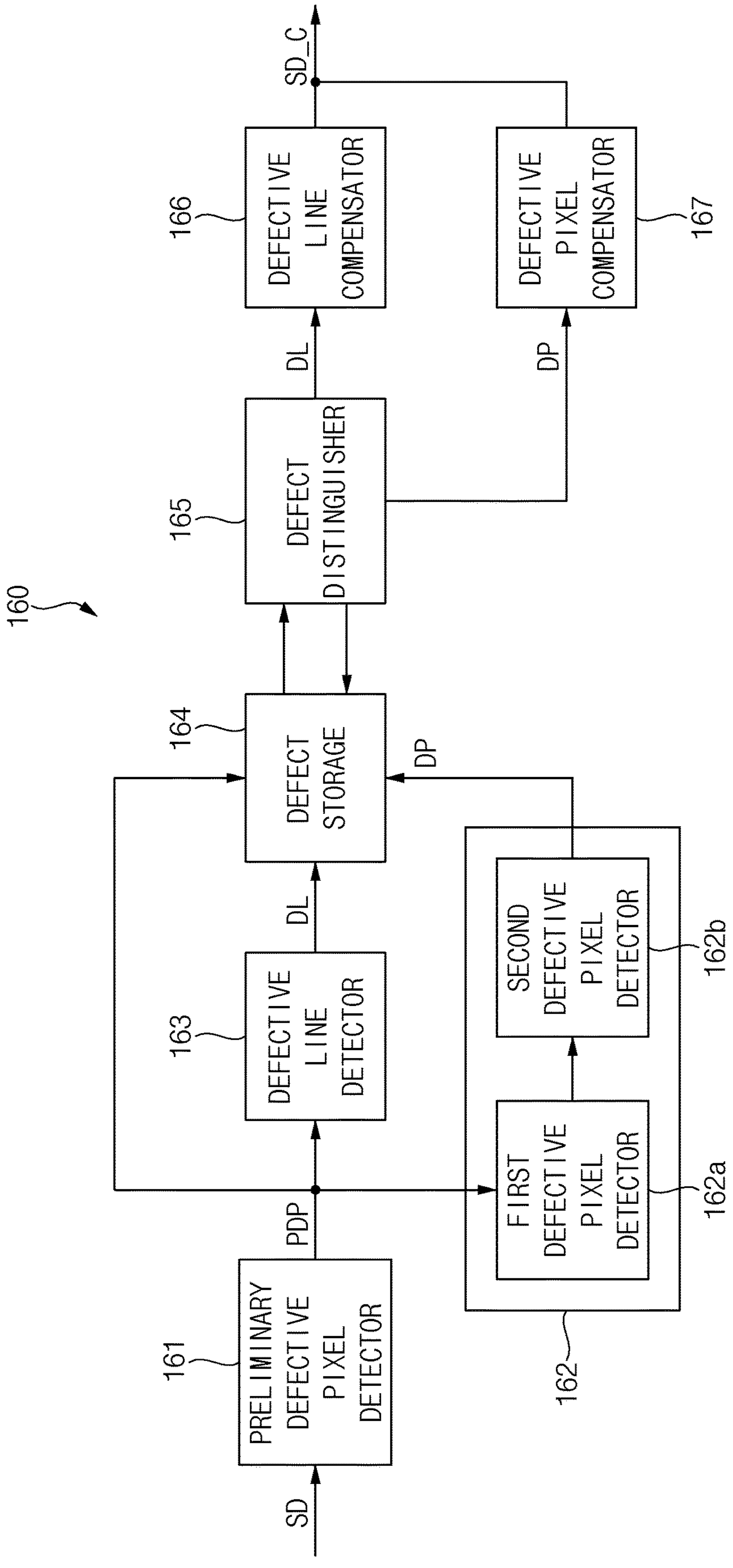
FIG. 4 is a block diagram illustrating an example of a panel defect normalizer of FIG. 1.
Figure 5:
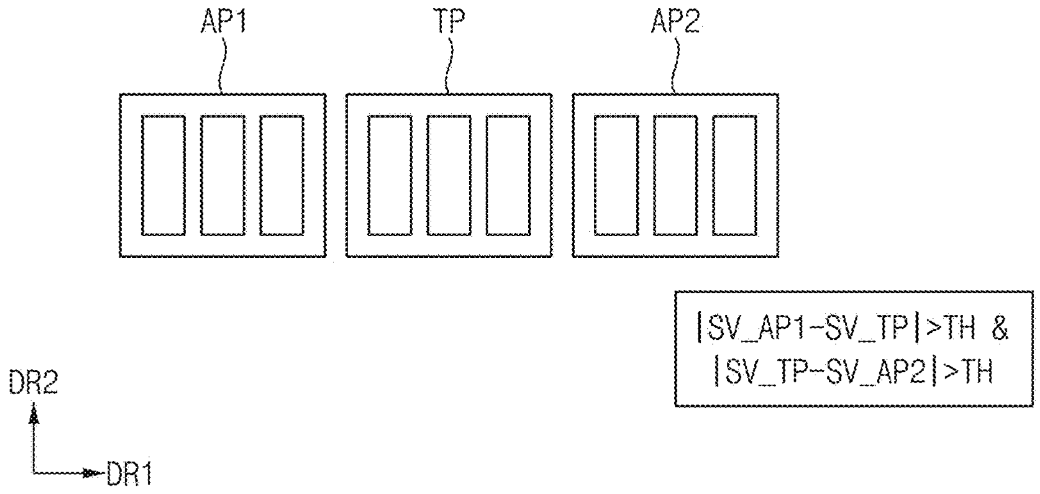
FIG. 5 is a diagram illustrating an operation of a preliminary defective pixel detector of FIG. 4.
Figure 6:
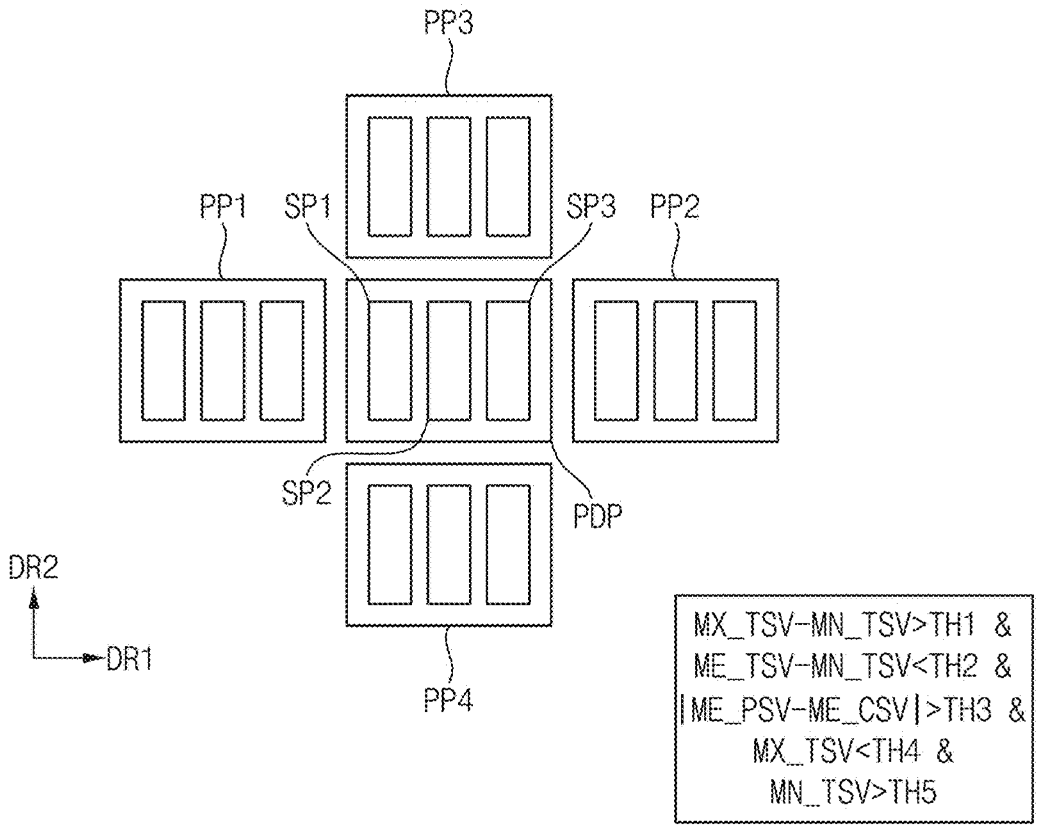
FIG. 6 is a diagram illustrating an operation of a first defective pixel detector of FIG. 4.
Figure 7:
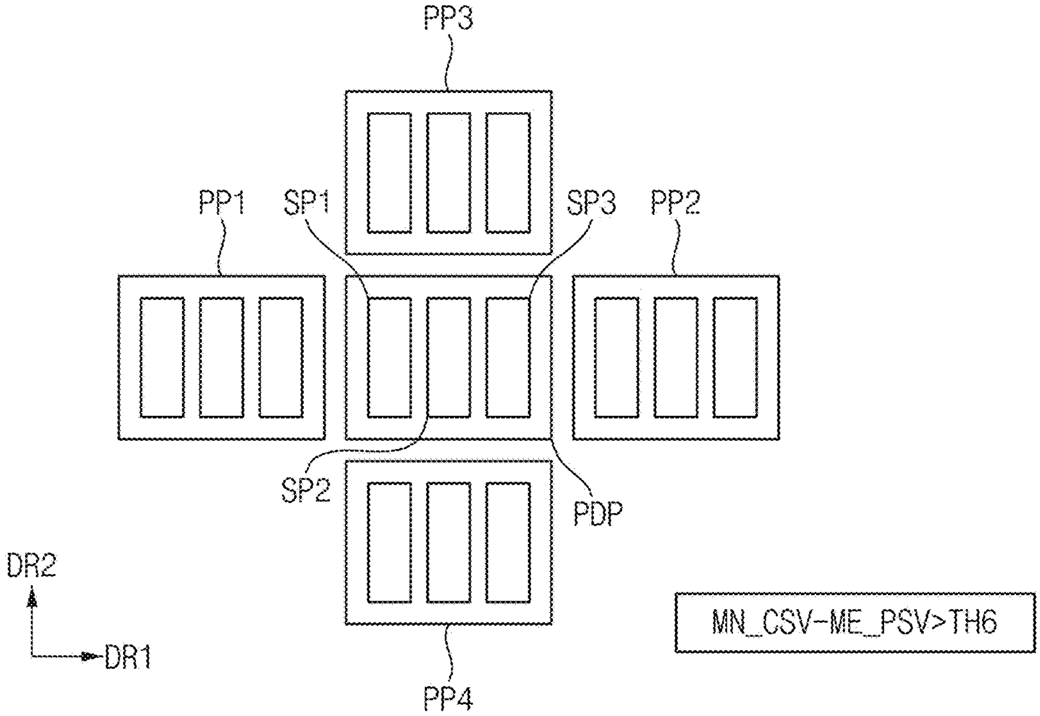
FIG. 7 is a diagram illustrating an operation of a second defective pixel detector of FIG. 4.
Figure 8:
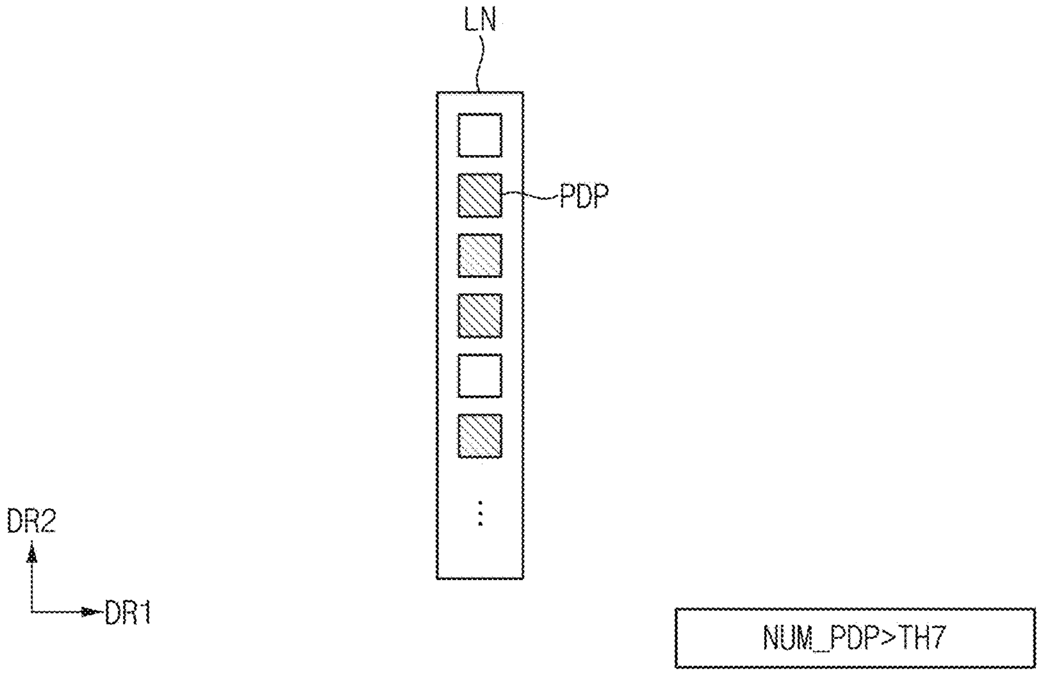
FIG. 8 is a diagram illustrating an operation of a defective line detector of FIG. 4.
Figure 9:
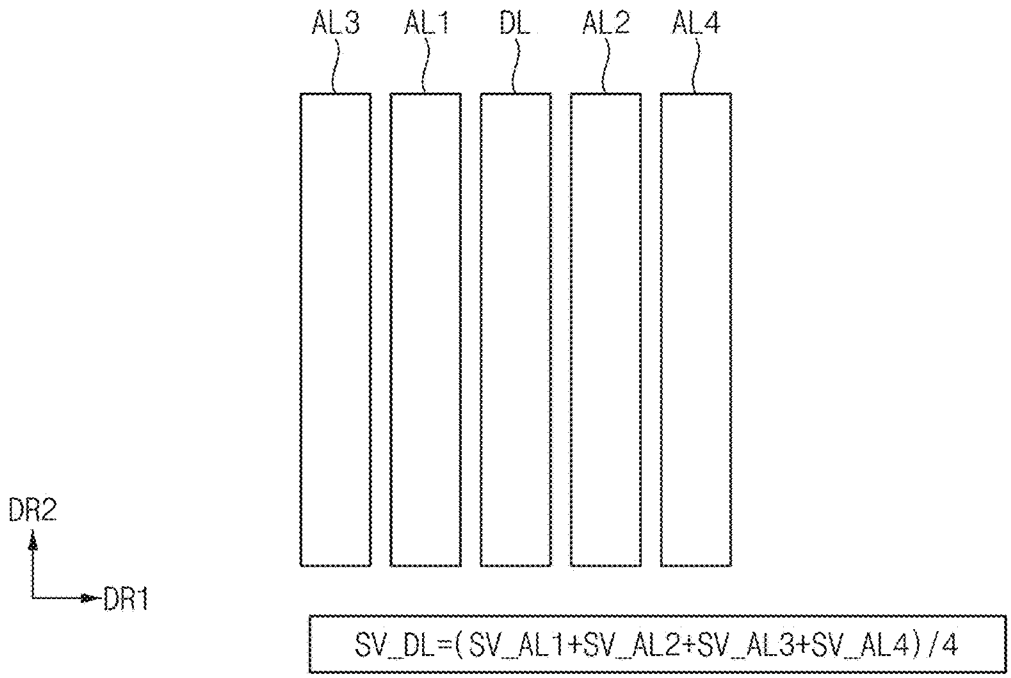
FIG. 9 is a diagram illustrating an operation of a defective line compensator of FIG. 4.
Figure 10:
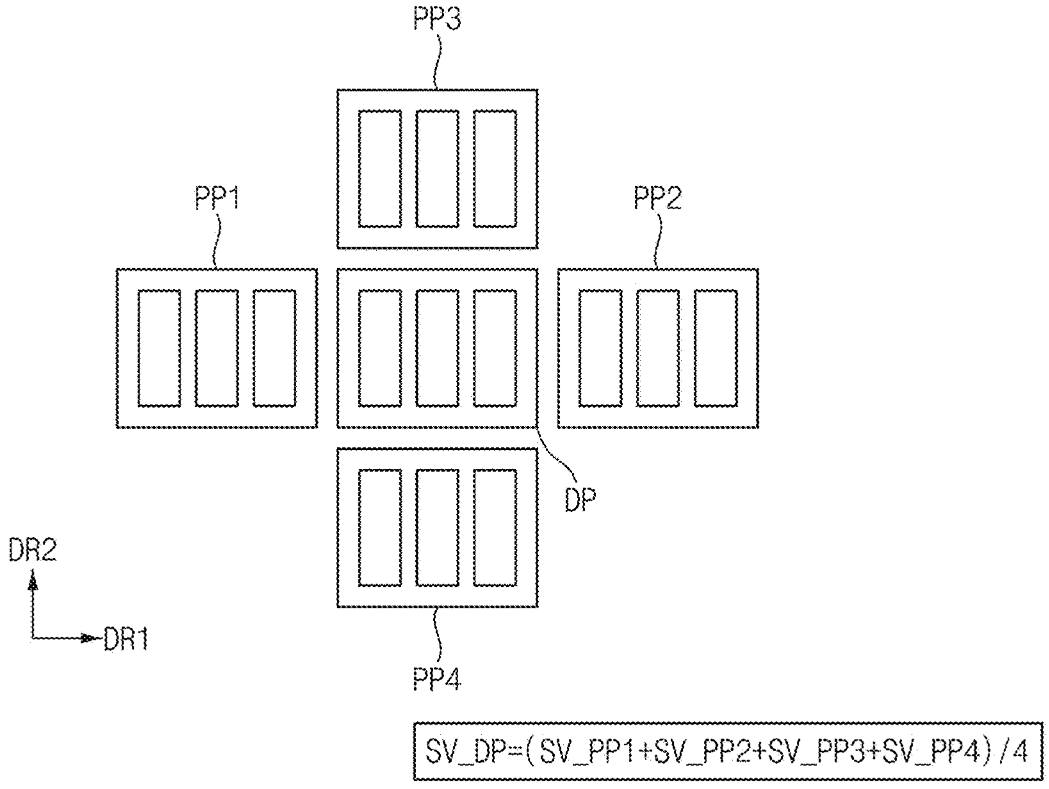
FIG. 10 is a diagram illustrating an operation of a defective pixel compensator of FIG. 4.

FIG. 4 is a block diagram illustrating an example of a panel defect normalizer 160 of FIG. 1. FIG. 5 is a diagram illustrating an operation of a preliminary defective pixel detector 161 of FIG. 4. FIG. 6 is a diagram illustrating an operation of a first defective pixel detector 162*a* of FIG. 4. FIG. 7 is a diagram illustrating an operation of a second defective pixel detector 162*b* of FIG. 4. FIG. 8 is a diagram illustrating an operation of a defective line detector 163 of FIG. 4. FIG. 9 is a diagram illustrating an operation of a defective line compensator 166 of FIG. 4. FIG. 10 is a diagram illustrating an operation of a defective pixel compensator 167 of FIG. 4.

Referring to FIGS. 4 to 10, the panel defect normalizer 160 may compensate for the sensing data SD including the sensing values of the pixels PX to generate compensation sensing data SD_C including compensation sensing values of the pixels PX. The panel defect normalizer 160 may include a preliminary defective pixel detector 161, a defective pixel detector 162, a defective line detector 163, a defect storage 164, a defect distinguisher 165, a defective line compensator 166, and a defective pixel compensator 167.

The preliminary defective pixel detector 161 may detect a preliminary defective pixel PDP by comparing a sensing value SV_TP of a target pixel TP with a sensing value of an adjacent pixel adjacent to the target pixel TP in the first direction DR1.

In an embodiment, the preliminary defective pixel detector 161 may determine the target pixel TP as the preliminary defective pixel PDP when a difference between the sensing value SV_TP of the target pixel TP and the sensing value of the adjacent pixel is greater than a threshold value TH. For example, as illustrated in FIG. 5, the preliminary defective pixel detector 161 may determine the target pixel TP as the preliminary defective pixel PDP when a difference between a sensing value SV_AP1 of a first adjacent pixel AP1 adjacent to a left side of the target pixel TP and the sensing value SV_TP of the target pixel TP is greater than the threshold value TH, and a difference between the sensing value SV_TP of the target pixel TP and a sensing value SV_AP2 of a second adjacent pixel AP2 adjacent to a right side of the target pixel TP is greater than the threshold value TH.

The defective pixel detector 162 may detect a defective pixel DP by comparing a sensing value of the preliminary defective pixel PDP with sensing values of peripheral pixels surrounding (e.g., around a periphery of) the preliminary defective pixel PDP. The defective pixel detector 162 may include a first defective pixel detector 162*a* and a second defective pixel detector 162*b*.

The first defective pixel detector 162*a*, as illustrated in FIG. 6, may determine the preliminary defective pixel PDP as the defective pixel DP when a difference between a maximum value MX_TSV of total sensing values including central sensing values, which are sensing values of sub-pixels SP1, SP2, and SP3 of the preliminary defective pixel PDP, and peripheral sensing values, which are sensing values of sub-pixels SP1, SP2, and SP3 of the peripheral pixels, and a minimum value MN_TSV of the total sensing values is greater than a first threshold value TH1, a difference between a median value ME_TSV of the total sensing values and the minimum value MN_TSV of the total sensing values is less than a second threshold value TH2, a difference between a median value ME_PSV of the peripheral sensing values and a median value ME_CSV of the central sensing values is greater than a third threshold value TH3, the maximum value MX_TSV of the total sensing values is less than a fourth threshold value TH4, and the minimum value MN_TSV of the total sensing values is greater than a fifth threshold value TH5.

In an embodiment, as illustrated in FIG. 6, the peripheral pixels surrounding (e.g., around a periphery of) the preliminary defective pixel PDP may include a first peripheral pixel PP1 adjacent to a left side of the preliminary defective pixel PDP, a second peripheral pixel PP2 adjacent to a right side of the preliminary defective pixel PDP, a third peripheral pixel PP3 adjacent to an upper side of the preliminary defective pixel PDP, and a fourth peripheral pixel PP4 adjacent to a lower side of the preliminary defective pixel PDP. For example, the maximum value MX_TSV of the total sensing values may be the largest sensing value among 15 sensing values including the sensing values of the sub-pixels SP1, SP2, and SP3 of the preliminary defective pixel PDP, sensing values of the sub-pixels SP1, SP2, and SP3 of the first peripheral pixel PP1, sensing values of the sub-pixels SP1, SP2, and SP3 of the second peripheral pixel PP2, sensing values of the sub-pixels SP1, SP2, and SP3 of the third peripheral pixel PP3, and sensing values of the sub-pixels SP1, SP2, and SP3 of the fourth peripheral pixel PP4. The minimum value MN_TSV of the total sensing values may be the smallest sensing value among the 15 sensing values, and the median value ME_TSV of the total sensing values may be the $8^{th}$ largest sensing value among the 15 sensing values. For example, the median value ME_PSV of the peripheral sensing values may be the $6^{th}$ or $7^{th}$ largest sensing value among 12 sensing values including the sensing values of the sub-pixels SP1, SP2, and SP3 of the first peripheral pixel PP1, the sensing values of the sub-pixels SP1, SP2, and SP3 of the second peripheral pixel PP2, the sensing values of the sub-pixels SP1, SP2, and SP3 of the third peripheral pixel PP3, and the sensing values of the sub-pixels SP1, SP2, and SP3 of the fourth peripheral pixel PP4. For example, the median value ME_CSV of the central sensing values may be the second largest sensing value among three sensing values including the sensing values of the sub-pixels SP1, SP2, and SP3 of the preliminary defective pixel PDP.

The second defective pixel detector 162*b*, as illustrated in FIG. 7, may determine the preliminary defective pixel PDP as the defective pixel DP when a value obtained by subtracting the median value ME_PSV of the peripheral sensing values, which are the sensing values of the sub-pixels SP1, SP2, and SP3 of the peripheral pixels, from a minimum value MN_CSV of the central sensing values, which are the sensing values of the sub-pixels SP1, SP2, and SP3 of the preliminary defective pixel PDP, is greater than a threshold value TH6. For example, the minimum value MN_CSV of the center sensing values may be the smallest sensing value among three sensing values including the sensing values of the sub-pixels SP1, SP2, and SP3 of the preliminary defective pixel PDP.

The defective line detector 163, as illustrated in FIG. 8, may detect the defective line DL by counting the number of preliminary defective pixels PDP included in a line LN extending in a second direction DR2. The second direction DR2 may intersect or cross the first direction DR1. For example, the second direction DR2 may be orthogonal to or substantially orthogonal to the first direction DR1.

In an embodiment, the defective line detector 163, as illustrated in FIG. 8, may determine the line LN as the defective line DL when the number NUM_PDP of the preliminary defective pixels PDP included in the line LN is greater than a threshold value TH7.

The defect storage 164 may store a position of the preliminary defective pixel PDP, a position of the defective line DL, and a position of the defective pixel DP.

The defect distinguisher 165 may distinguish an in-line defective pixel included in the defective line DL from an out-line defective pixel not included in the defective line DL based on the position of the defective line DL and the position of the defective pixel DP. The defect storage 164 may delete the position of the in-line defective pixel from the positions of the stored defective pixels DP. Accordingly, a storage space of the defect storage 164 may be prevented or substantially prevented from unnecessarily increasing.

The defective line compensator 166 may compensate for the sensing value of the defective line DL.

In an embodiment, the defective line compensator 166, as illustrated in FIG. 9, may replace the sensing value SV_DL of the defective line DL with an average value of sensing values of adjacent lines adjacent to the defective line DL in the first direction DR1. For example, the defective line compensator 166 may replace the sensing value SV_DL of the defective line DL with an average value of a sensing value SV_AL1 of a first adjacent line AL1 adjacent to a left side of the defective line DL, a sensing value SV_AL2 of a second adjacent line AL2 adjacent to a right side of the defective line DL, a sensing value SV_AL3 of a third adjacent line AL3 adjacent to the left side of the defective line DL with the first adjacent line AL1 interposed therebetween, and a sensing value SV_AL4 of a fourth adjacent line AL4 adjacent to the right side of the defective line DL with the second adjacent line AL2 interposed therebetween. For example, the defective line compensator 166 may replace the sensing value SV_DL of the defective line DL with an average value of three sensing values excluding the largest or smallest sensing value among four sensing values including the sensing value SV_AL1 of the first adjacent line AL1, the sensing value SV_AL2 of the second adjacent line AL2, the sensing value SV_AL3 of the third adjacent line AL3, and the sensing value SV_AL4 of the fourth adjacent line AL4.

The defective pixel compensator 167 may compensate for the sensing value of the defective pixel DP.

In an embodiment, the defective pixel compensator 167, as illustrated in FIG. 10, may replace the sensing value SV_DP of the defective pixel DP with an average value of the sensing values of the peripheral pixels surrounding (e.g., around a periphery of) the defective pixel DP. For example, the defective pixel compensator 167 may replace the sensing value SV_DP of the defective pixel DP with an average value of the sensing value SV_PP1 of the first peripheral pixel PP1 adjacent to the left side of the defective pixel DP, the sensing value SV_PP2 of the second peripheral pixel PP2 adjacent to the right side of the defective pixel DP, the sensing value SV_PP3 of the third peripheral pixel PP3 adjacent to the upper side of the defective pixel DP, and the sensing value SV_PP4 of the fourth peripheral pixel PP4 adjacent to the lower side of the defective pixel DP. For example, the defective pixel compensator 167 may replace the sensing value SV_DP of the defective pixel DP with an average value of the sensing value SV_PP1 of the first peripheral pixel PP1 adjacent to the left side of the defective pixel DP, the sensing value SV_PP2 of the second peripheral pixel PP2 adjacent to the right side of the defective pixel DP, the sensing value SV_PP3 of the third peripheral pixel PP3 adjacent to the upper side of the defective pixel DP, the sensing value SV_PP4 of the fourth peripheral pixel PP4 adjacent to the lower side of the defective pixel DP, a sensing value of a fifth peripheral pixel adjacent to an upper left side of the defective pixel DP, a sensing value of a sixth peripheral pixel adjacent to an upper right side of the defective pixel DP, a sensing value of a seventh peripheral pixel adjacent to a lower left side of the defective pixel DP, and a sensing value of an eighth peripheral pixel adjacent to a lower right side of the defective pixel DP.

In an embodiment, the defective pixel compensator 167 may not compensate for the sensing value of the in-line defective pixel included in the defective line DL. The sensing value of the in-line defective pixel may be compensated for as the defective line compensator 166 compensates for the sensing value of the defective line DL, and accordingly, the defective pixel compensator 167 may not compensate for the sensing value of the in-line defective pixel to prevent or substantially prevent the sensing value of the in-line defective pixel from being redundantly compensated for.

In a comparative example, when only the defective line is detected during a manufacturing process of the display device, a manufacturing time of the display device may be reduced, but the display device may include the defective pixel, and thus, a yield of the display device may be reduced. Further, in a comparative example, when the defective pixel is detected for all pixels during the manufacturing process of the display device, the yield of the display device may be increased, but the manufacturing time of the display device may also be increased. For example, a detection time of the defective line may be about 10 seconds, and a detection time of the defective pixel for all pixels may be about 50 seconds. Accordingly, a defective processing time may be about 10 seconds when only the defective line is detected, and the defective processing time may be about 60 seconds when the defective pixel is detected for the defective line and all pixels.

In some embodiments of the present disclosure, the defective pixel may be detected only for the preliminary defective pixel detected to detect the defective line, so that the yield of the display device may be increased, and the manufacturing time of the display device may be reduced. For example, a detection time of the defective pixel for the preliminary defective pixel may be about 0.5 seconds. Accordingly, the defective processing time may be about 10.5 seconds when the defective pixel is detected for the defective line and the preliminary defective pixel.

Figure 11:
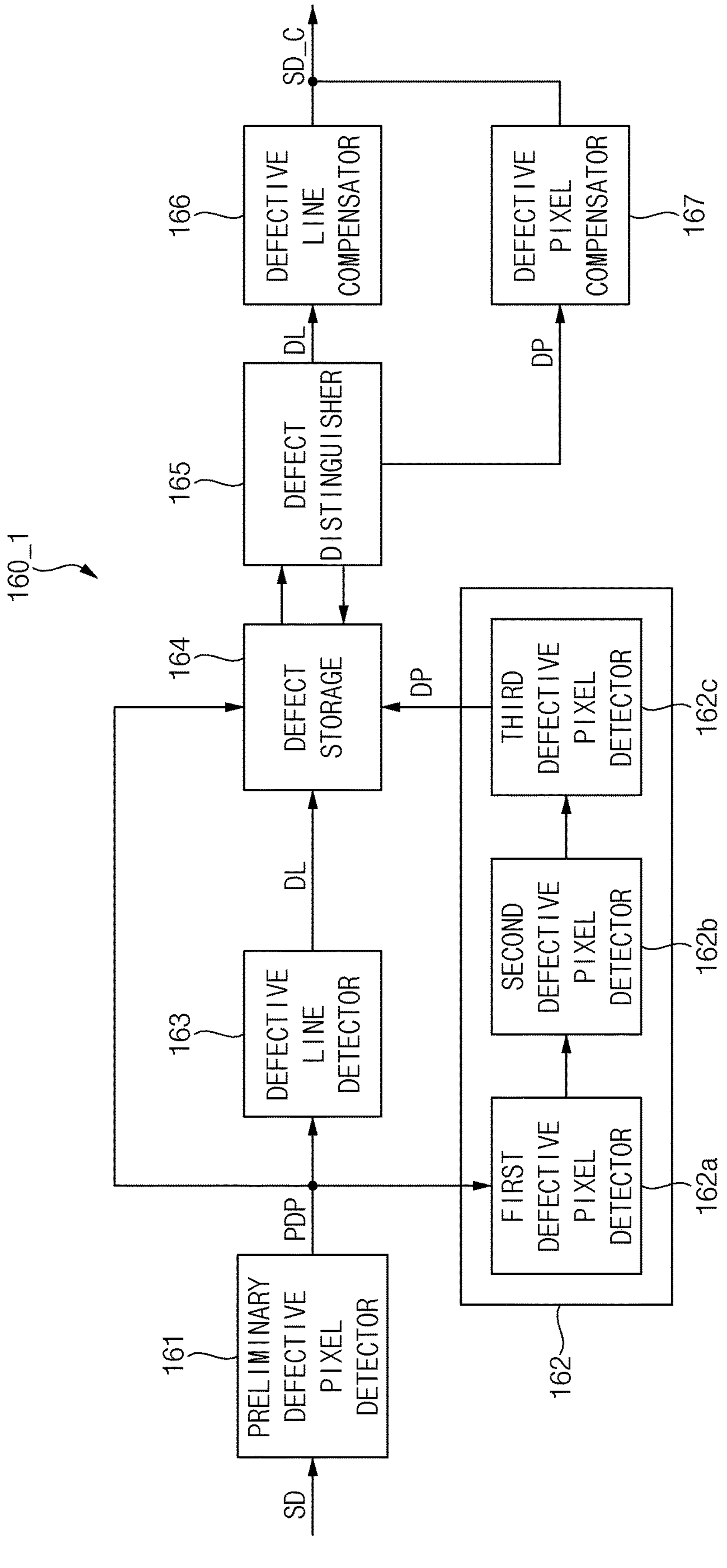
FIG. 11 is a block diagram illustrating an example of a panel defect normalizer of FIG. 1.
Figure 12:
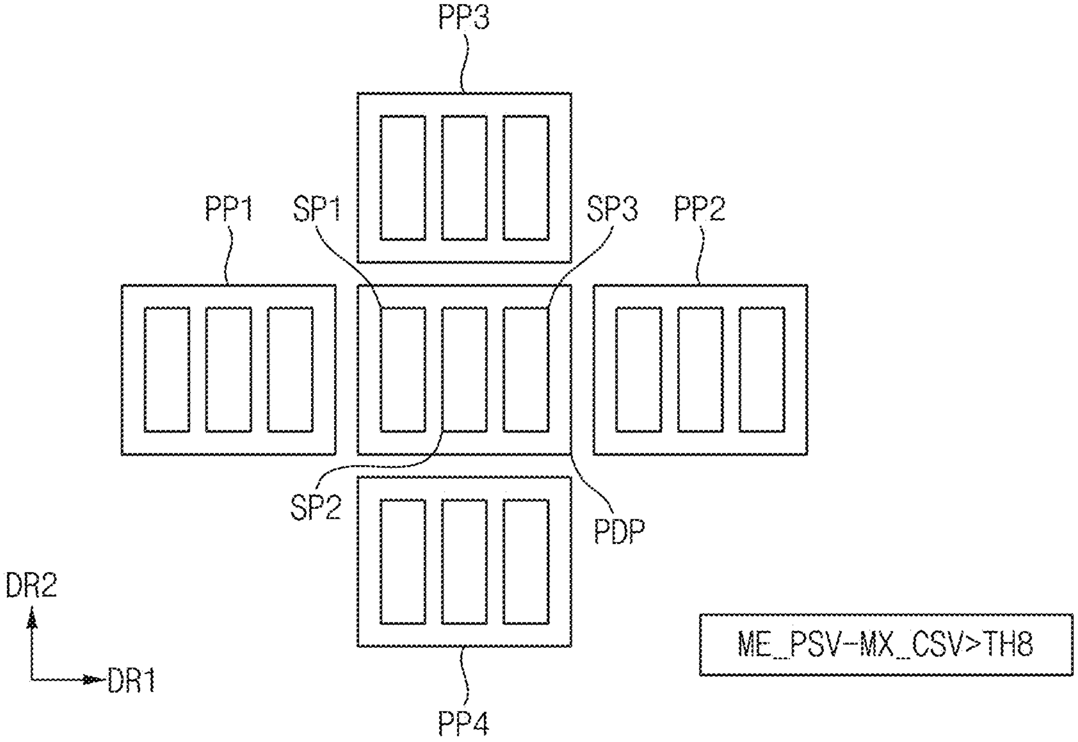
FIG. 12 is a diagram illustrating an operation of a third defective pixel detector of FIG. 11.

FIG. 11 is a block diagram illustrating an example of a panel defect normalizer 160_1 of FIG. 1. FIG. 12 is a diagram illustrating an operation of a third defective pixel detector 162*c* of FIG. 11.

Referring to FIGS. 11 and 12, a panel defect normalizer 160_1 may include a preliminary defective pixel detector 161, a defective pixel detector 162_1, a defective line detector 163, a defect storage 164, a defect distinguisher 165, a defective line compensator 166, and a defective pixel compensator 167. Redundant description of the components of the panel defect normalizer 160_1 illustrated in FIGS. 11 and 12 that are the same or substantially the same as (or similar to) those of the panel defect normalizer 160 described above with reference to FIGS. 4 to 10 may not be repeated.

The defective pixel detector 162_1 may include a first defective pixel detector 162*a*, a second defective pixel detector 162*b*, and a third defective pixel detector 162*c*.

In an embodiment, the third defective pixel detector 162*c*, as illustrated in FIG. 12, may determine the preliminary defective pixel PDP as the defective pixel DP when a value obtained by subtracting a maximum value MX_CSV of the center sensing values, which are the sensing values of the sub-pixels SP1, SP2, and SP3 of the preliminary defective pixel PDP, from the median value ME_PSV of the peripheral sensing values, which are the sensing values of the sub-pixels SP1, SP2, and SP3 of the peripheral pixels, is greater than a threshold value TH8. For example, the maximum value MX_CSV of the center sensing values may be the largest sensing value among three sensing values including the sensing values of the sub-pixels SP1, SP2, and SP3 of the preliminary defective pixel PDP.

Figure 13:
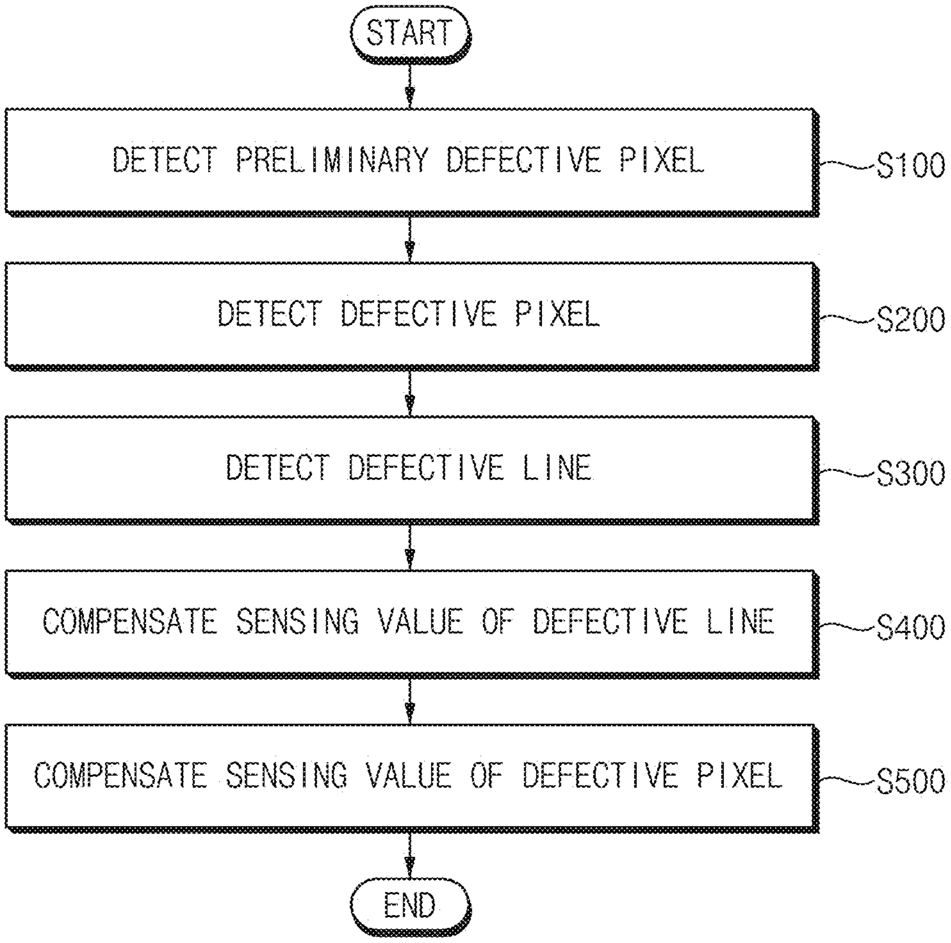
FIG. 13 is a flowchart illustrating an inspection method of a display device according to an embodiment.

FIG. 13 is a flowchart illustrating an inspection method of a display device according to an embodiment.

Referring to FIGS. 5 to 10, 12, and 13, an inspection method of a display device may start, and the preliminary defective pixel PDP may be detected (S100) by comparing the sensing value SV_TP of the target pixel TP with the sensing value of the adjacent pixel adjacent to the target pixel TP in the first direction DR1. The defective pixel DP may be detected (S200) by comparing the sensing value of the preliminary defective pixel PDP with the sensing values of the peripheral pixels surrounding (e.g., around a periphery of) the preliminary defective pixel PDP. The preliminary defective line DL may be detected (S300) by counting the number of preliminary defective pixels PDP included in the line LN extending in the second direction DR2. The sensing value of the defective line DL may be compensated for (S400). The sensing value of the defective pixel DP may be compensated for (S500), and the method may end.

In the detection of the preliminary defective pixel PDP (S100), the target pixel TP may be determined as the preliminary defective pixel PDP when the difference between the sensing value SV_TP of the target pixel TP and the sensing value of the adjacent pixel is greater than the threshold value TH. For example, as illustrated in FIG. 5, the target pixel TP may be determined as the preliminary defective pixel PDP when the difference between the sensing value SV_AP1 of the first adjacent pixel AP1 adjacent to the left side of the target pixel TP and the sensing value SV_TP of the target pixel TP is greater than the threshold value TH, and the difference between the sensing value SV_TP of the target pixel TP and the sensing value SV_AP2 of the second adjacent pixel AP2 adjacent to the right side of the target pixel TP is greater than the threshold value TH.

In the detection of the defective pixel DP (S200), as illustrated in FIG. 6, the preliminary defective pixel PDP may be determined as the defective pixel DP when the difference between the maximum value MX_TSV of the total sensing values including the sensing values of the sub-pixels SP1, SP2, and SP3 of the preliminary defective pixel PDP and the peripheral sensing values of the sub-pixels SP1, SP2, and SP3 of the peripheral pixels and the minimum value MN_TSV of the total sensing values is greater than the first threshold value TH1, the difference between the median value ME_TSV of the total sensing values and the minimum value MN_TSV of the total sensing values is less than the second threshold value TH2, the difference between the median value ME_PSV of the peripheral sensing values and the median value ME_CSV of the central sensing values is greater than the third threshold value TH3, the maximum value MX_TSV of the total sensing values is less than the fourth threshold value TH4, and the difference between the minimum value MN_TSV of the total sensing values is greater than the fifth threshold value TH5.

In an embodiment, as illustrated in FIG. 6, the peripheral pixels surrounding (e.g., around a periphery of) the preliminary defective pixel PDP may include the first peripheral pixel PP1 adjacent to the left side of the preliminary defective pixel PDP, the second peripheral pixel PP2 adjacent to the right side of the preliminary defective pixel PDP, the third peripheral pixel PP3 adjacent to the upper side of the preliminary defective pixel PDP, and the fourth peripheral pixel PP4 adjacent to the lower side of the preliminary defective pixel PDP. For example, the maximum value MX_TSV of the total sensing values may be the largest sensing value among 15 sensing values including the sensing values of the sub-pixels SP1, SP2, and SP3 of the preliminary defective pixel PDP, the sensing values of the sub-pixels SP1, SP2, and SP3 of the first peripheral pixel PP1, the sensing values of the sub-pixels SP1, SP2, and SP3 of the second peripheral pixel PP2, the sensing values of the sub-pixels SP1, SP2, and SP3 of the third peripheral pixel PP3, and the sensing values of the sub-pixels SP1, SP2, and SP3 of the fourth peripheral pixel PP4. The minimum value MN_TSV of the total sensing values may be the smallest sensing value among the 15 sensing values, and the median value ME_TSV of the total sensing values may be $8^{th}$ largest sensing value among the 15 sensing values. For example, the median value ME_PSV of the peripheral sensing values may be the 6$^{th}$ or 7$^{th}$ largest sensing value among 12 sensing values including the sensing values of the sub-pixels SP1, SP2, and SP3 of the first peripheral pixel PP1, the sensing values of the sub-pixels SP1, SP2, and SP3 of the second peripheral pixel PP2, the sensing values of the sub-pixels SP1, SP2, and SP3 of the third peripheral pixel PP3, and the sensing values of the sub-pixels SP1, SP2, and SP3 of the fourth peripheral pixel PP4. For example, the median value ME_CSV of the central sensing values may be the second largest sensing value among the three sensing values including the sensing values of the sub-pixels SP1, SP2, and SP3 of the preliminary defective pixel PDP.

In detecting the defective pixel DP (S200), as shown in FIG. 7, if (e.g., when) the value obtained by subtracting the median value ME_PSV of the peripheral sensing values, which are the sensing values of the sub-pixels SP1, SP2, and SP3 of the peripheral pixels, from the minimum value MN_CSV of the central sensing values, which are the sensing values of the sub-pixels SP1, SP2, and SP3 of the preliminary defective pixel PDP, is greater than the threshold value TH6, the preliminary defective pixel PDP may be determined as a defective pixel DP. For example, the minimum value MN_CSV of the central sensing values may be the smallest sensing value among three sensing values including the sensing values of the sub-pixels SP1, SP2, and SP3 of the preliminary defective pixel PDP.

In the detection of the defective pixel DP (S200), as illustrated in FIG. 12, the preliminary defective pixel PDP may be determined as the defective pixel DP when the value obtained by subtracting the maximum value MX_CSV of the central sensing values, which are the sensing values of the sub-pixels SP1, SP2, and SP3 of the preliminary defective pixel PDP, from the median value ME_PSV of the peripheral sensing values, which are the sensing values of the sub-pixels SP1, SP2, and SP3 of the peripheral pixels, is greater than the threshold value TH8. For example, the maximum value MX_CSV of the center sensing values may be the largest sensing value among three sensing values including the sensing values of the sub-pixels SP1, SP2, and SP3 of the preliminary defective pixel PDP.

In the detection of the defective line DL (S300), as illustrated in FIG. 8, the line LN may be determined as the defective line DL when the number NUM_PDP of the preliminary defective pixels PDP included in the line LN is greater than the threshold value TH7.

In the compensation of the sensing value of the defective line DL (S400), as illustrated in FIG. 9, the sensing value SV_DL of the defective line DL may be replaced with the average value of the sensing values of the adjacent lines adjacent to the defective line DL in the first direction DR1. For example, the sensing value SV_DL of the defective line DL may be replaced by the average value of the sensing value SV_AL1 of the first adjacent line AL1 adjacent to the left of the defective line DL, the sensing value SV_AL2 of the second adjacent line AL2 adjacent to the right of the defective line DL, the sensing value SV_AL3 of the third adjacent line AL3 adjacent to the left of the defective line DL with the first adjacent line AL1 interposed therebetween, and the sensing value SV_AL4 of the fourth adjacent line AL4 adjacent to the right of the defective line DL with the second adjacent line AL2 interposed therebetween. For example, the sensing value SV_DL of the defective line DL may be replaced by the average value of three sensing values excluding the largest or smallest sensing value among the four sensing values including the sensing value SV_AL1 of the first adjacent line AL1, the sensing value SV_AL2 of the second adjacent line AL2, the sensing value SV_AL3 of the third adjacent line AL3, and the sensing value SV_AL4 of the fourth adjacent line AL4.

In the compensation of the sensing value of the defective pixel DP (S500), as illustrated in FIG. 10, the sensing value SV_DP of the defective pixel DP may be replaced by the average value of the sensing values of the peripheral pixels surrounding (e.g., around a periphery of) the defective pixel DP. For example, the sensing value SV_DP of the defective pixel DP may be replaced by the average value of the sensing value SV_PP1 of the first peripheral pixel PP1 adjacent to the left of the defective pixel DP, the sensing value SV_PP2 of the second peripheral pixel PP2 adjacent to the right of the defective pixel DP, the sensing value SV_PP3 of the third peripheral pixel PP3 adjacent to the upper side of the defective pixel DP, and the sensing value SV_PP4 of the fourth peripheral pixel PP4 adjacent to the lower side of the defective pixel DP. For example, the sensing value SV_DP of the defective pixel DP may be replaced by the average value of the sensing value SV_PP1 of the first peripheral pixel PP1 adjacent to the left of the defective pixel DP, the sensing value SV_PP2 of the second peripheral pixel PP2 adjacent to the right of the defective pixel DP, the sensing value SV_PP3 of the third peripheral pixel PP3 adjacent to the upper side of the defective pixel DP, the sensing value SV_PP4 of the fourth peripheral pixel PP4 adjacent to the lower side of the defective pixel DP, the sensing value of the fifth peripheral pixel adjacent to the upper left side of the defective pixel DP, the sensing value of the sixth peripheral pixel adjacent to the upper right side of the defective pixel DP, the sensing value of the seventh peripheral pixel adjacent to the lower left side of the defective pixel DP, and the sensing value of the eighth peripheral pixel adjacent to the lower right side of the defective pixel DP.

Figure 14:
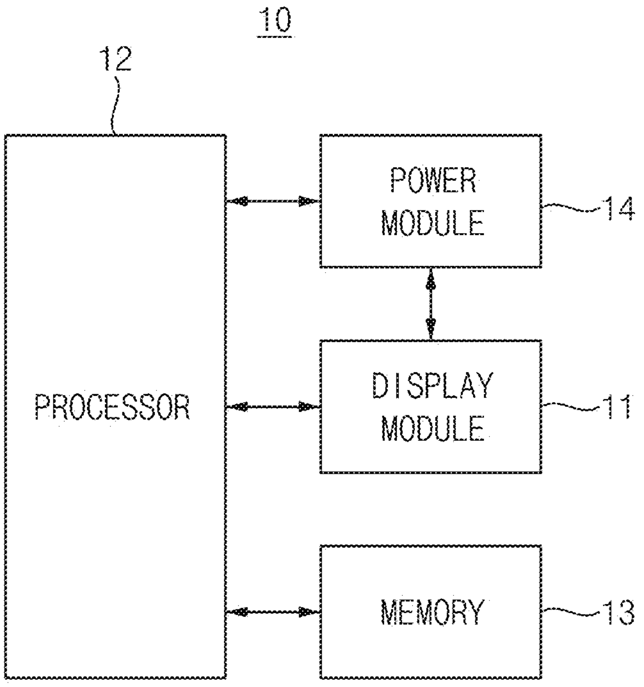
FIG. 14 is a block diagram illustrating an electronic device according to an embodiment.

FIG. 14 is a block diagram illustrating an electronic device 10 according to an embodiment.

Referring to FIG. 14, the electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and/or a controller.

The memory 13 may store data information used for an operation of the processor 12 or the display module 11. When the processor 12 executes an application stored in the memory 13, the image data IMD of FIG. 1 and the controller control signal CCS of FIG. 1 may be transmitted to the display module 11, and the display module 11 may output image information based on the image data IMD and the controller control signal CCS.

The power module 14 may include a power supply, such as a power adapter, a battery device, and/or the like, and a power conversion module that converts power supplied by the power supply to generate power used for an operation of the electronic device 10.

At least one of the components of the electronic device 10 described above may be included in the display device 100 of FIG. 1 according to some of the embodiments described above. Further, some of individual modules functionally included in one module may be included in the display device 100, and others may be provided separately from the display device 100. For example, the display device 100 may include the display module 11, and the processor 12, the memory 13, and the power module 14 may be provided in the form of other devices within the electronic device 11 other than the display device 100.

Figure 15:
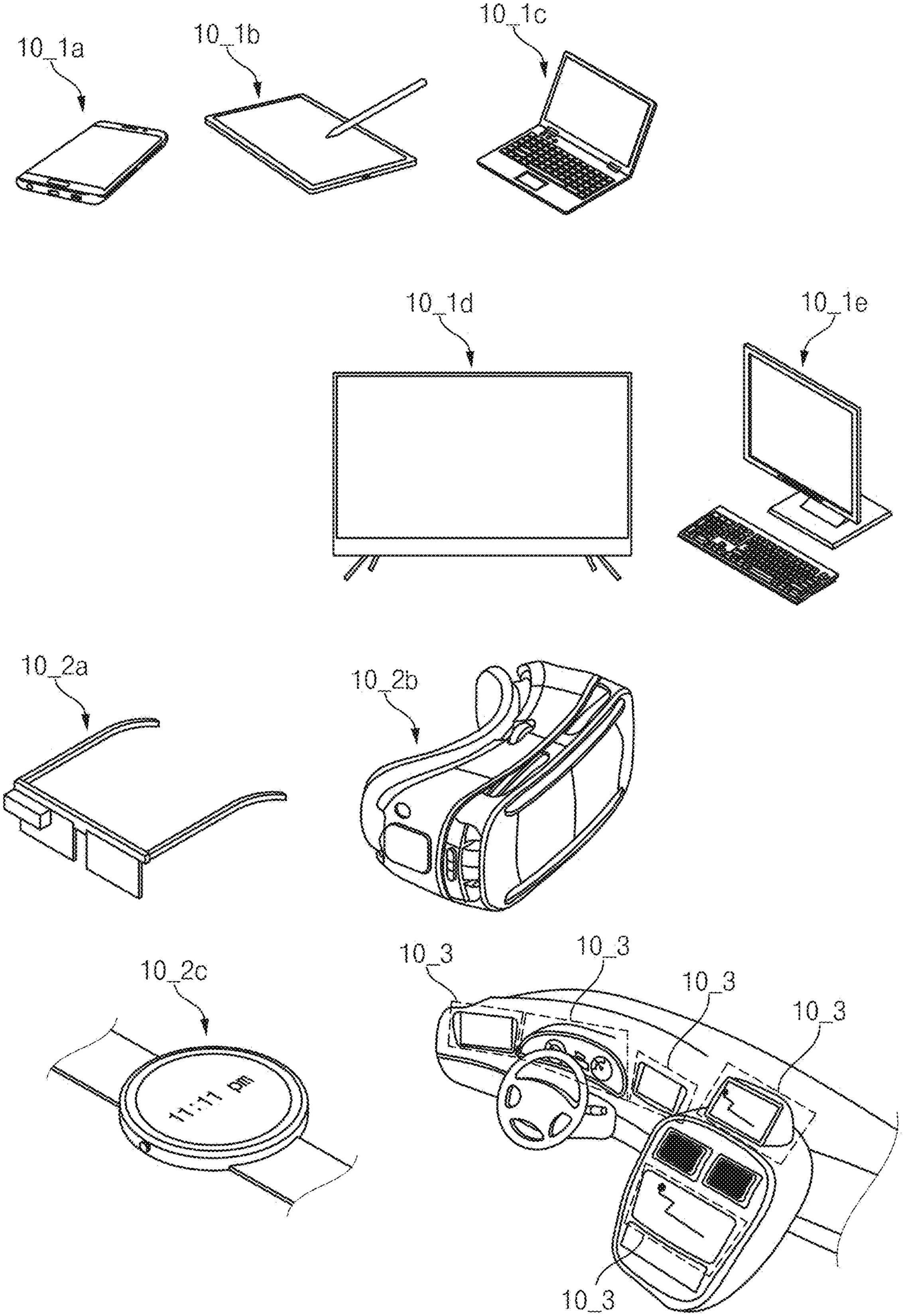
FIG. 15 is a diagram illustrating some electronic devices according to various embodiments.

FIG. 15 is a diagram illustrating some electronic devices according to various embodiments.

Referring to FIG. 15, electronic devices to which display devices according to some embodiments may be applied may include not only image display electronic devices, such as a smart phone 10_1*a*, a tablet PC 10_1*b*, a laptop 10_1*c*, a TV 101*d*, a desk monitor 10_1*e*, and the like, but also wearable electronic devices including display modules, such as smart glasses 10_2*a*, a head mounted display 10_2*b*, a smart watch 10_2*c*, and the like, and vehicle electronic devices 10_3 including display modules, such as an instrument panel of an automobile, a center fascia, a center information display (CID) arranged on a dashboard, a room mirror display, and the like.

The display device according to some embodiments may be applied to a display device included in a computer, a notebook, a mobile phone, a smart phone, a smart pad, a smart watch, a PMP, a PDA, an MP3 player, or the like.

The electronic or electric devices and/or any other relevant devices or components according to embodiments of the present disclosure described herein (e.g., the preliminary defective pixel detector, the first defective pixel detector, the second defective pixel detector, the third defective panel detector, the defective line detector, the defect distinguisher, the defective line compensator, the defective pixel compensator, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a display panel comprising a plurality of pixels;

a sensing circuit configured to generate sensing values of the plurality of pixels by sensing characteristics of the plurality of pixels; and a panel defect normalizer configured to compensate for the sensing values, the panel defect normalizer comprising:

a preliminary defective pixel detector configured to detect a preliminary defective pixel by comparing a sensing value of a target pixel with a sensing value of an adjacent pixel adjacent to the target pixel in a first direction;

a defective pixel detector configured to detect a defective pixel by comparing a sensing value of the preliminary defective pixel with sensing values of peripheral pixels surrounding around the preliminary defective pixel;

a defective line detector configured to detect a defective line by counting a number of preliminary defective pixels included in a line extending in a second direction crossing the first direction;

a defective line compensator configured to compensate for a sensing value of the defective line; and a defective pixel compensator configured to compensate for a sensing value of the defective pixel.

2. The display device of claim 1, wherein the preliminary defective pixel detector is configured to determine the target pixel as the preliminary defective pixel when a difference between the sensing value of the target pixel and the sensing value of the adjacent pixel is greater than a threshold value.

3. The display device of claim 1, wherein the defective pixel detector comprises a first defective pixel detector configured to determine the preliminary defective pixel as the defective pixel when:

a difference between a maximum value of total sensing values including central sensing values, which are sensing values of sub-pixels of the preliminary defective pixel, and peripheral sensing values, which are sensing values of sub-pixels of the peripheral pixels, and a minimum value of the total sensing values is greater than a first threshold value;

a difference between a median value of the total sensing values and the minimum value of the total sensing values is less than a second threshold value;

a difference between a median value of the peripheral sensing values and a median value of the central sensing values is greater than a third threshold value;

the maximum value of the total sensing values is less than a fourth threshold value; and the minimum value of the total sensing values is greater than a fifth threshold value.

4. The display device of claim 1, wherein the defective pixel detector comprises a second defective pixel detector configured to determine the preliminary defective pixel as the defective pixel when a value obtained by subtracting a median value of peripheral sensing values, which are sensing values of sub-pixels of the peripheral pixels, from a minimum value of central sensing values, which are sensing values of sub-pixels of the preliminary defective pixel, is greater than a threshold value.

5. The display device of claim 1, wherein the defective pixel detector comprises a third defective pixel detector configured to determine the preliminary defective pixel as the defective pixel when a value obtained by subtracting a maximum value of central sensing values, which are sensing values of sub-pixels of the preliminary defective pixel, from a median value of peripheral sensing values, which are sensing values of sub-pixels of the peripheral pixels, is greater than a threshold value.

6. The display device of claim 1, wherein the defective line detector is configured to determine the line as the defective line when the number of the preliminary defective pixels included in the line is greater than a threshold value.

7. The display device of claim 1, wherein the defective line compensator is configured to replace the sensing value of the defective line with an average value of sensing values of adjacent lines adjacent to the defective line in the first direction.

8. The display device of claim 1, wherein the defective pixel compensator is configured to replace the sensing value of the defective pixel with an average value of sensing values of peripheral pixels surrounding around the defective pixel.

9. The display device of claim 1, wherein the panel defect normalizer further comprises a defect storage configured to store a position of the preliminary defective pixel, a position of the defective line, and a position of the defective pixel.

10. The display device of claim 9, wherein the panel defect normalizer further comprises a defect distinguisher configured to distinguish an in-line defective pixel included in the defective line from an out-line defective pixel not included in the defective line based on the position of the defective line and the position of the defective pixel.

11. The display device of claim 10, wherein the defective pixel compensator is configured to not compensate for a sensing value of the in-line defective pixel.

12. The display device of claim 1, wherein the characteristics of the plurality of pixels are one of threshold voltages of driving transistors included in the plurality of pixels, electron mobilities of the driving transistors, and degradations of light-emitting elements included in the plurality of pixels.

13. An inspection method of a display device, comprising:

detecting a preliminary defective pixel by comparing a sensing value of a target pixel with a sensing value of an adjacent pixel adjacent to the target pixel in a first direction;

detecting a defective pixel by comparing a sensing value of the preliminary defective pixel with sensing values of peripheral pixels surrounding around the preliminary defective pixel;

detecting a defective line by counting a number of preliminary defective pixels included in a line extending in a second direction crossing the first direction;

compensating for a sensing value of the defective line; and compensating for a sensing value of the defective pixel.

14. The inspection method of claim 13, wherein the detecting of the preliminary defective pixel comprises determining the target pixel as the preliminary defective pixel when a difference between the sensing value of the target pixel and the sensing value of the adjacent pixel is greater than a threshold value.

15. The inspection method of claim 13, wherein the detecting of the defective pixel comprises determining the preliminary defective pixel as the defective pixel when:

a difference between a maximum value of total sensing values including central sensing values, which are sensing values of sub-pixels of the preliminary defective pixel, and peripheral sensing values, which are sensing values of sub-pixels of the peripheral pixels, and a minimum value of the total sensing values is greater than a first threshold value;

a difference between a median value of the total sensing values and the minimum value of the total sensing values is less than a second threshold value;

a difference between a median value of the peripheral sensing values and a median value of the central sensing values is greater than a third threshold value;

the maximum value of the total sensing values is less than a fourth threshold value; and the minimum value of the total sensing values is greater than a fifth threshold value.

16. The inspection method of claim 13, wherein the detecting of the defective pixel comprises determining the preliminary defective pixel as the defective pixel when a value obtained by subtracting a median value of peripheral sensing values, which are sensing values of sub-pixels of the peripheral pixels, from a minimum value of central sensing values, which are sensing values of sub-pixels of the preliminary defective pixel, is greater than a threshold value.

17. The inspection method of claim 13, wherein the detecting of the defective pixel comprises determining the preliminary defective pixel as the defective pixel when a value obtained by subtracting a maximum value of central sensing values, which are sensing values of sub-pixels of the preliminary defective pixel, from a median value of peripheral sensing values, which are sensing values of sub-pixels of the peripheral pixels, is greater than a threshold value.

18. The inspection method of claim 13, wherein the detecting of the defective line comprises determining the line as the defective line when the number of the preliminary defective pixels included in the line is greater than a threshold value.

19. The inspection method of claim 13, wherein the compensating for the sensing value of the defective line comprises replacing the sensing value of the defective line with an average value of sensing values of adjacent lines adjacent to the defective line in the first direction.

20. An electronic device comprising:

a processor configured to generate image data;

a display device configured to display an image based on the image data; and a power module connected to the processor and the display device, wherein the display device comprises:

a display panel comprising a plurality of pixels;

a sensing circuit configured to generate sensing values of the plurality of pixels by sensing characteristics of the plurality of pixels; and a panel defect normalizer configured to compensate for the sensing values, the panel defect normalizer comprising:

a preliminary defective pixel detector configured to detect a preliminary defective pixel by comparing a sensing value of a target pixel with a sensing value of an adjacent pixel adjacent to the target pixel in a first direction;

a defective pixel detector configured to detect a defective pixel by comparing a sensing value of the preliminary defective pixel with sensing values of peripheral pixels surrounding around the preliminary defective pixel;

a defective line detector configured to detect a defective line by counting a number of preliminary defective pixels included in a line extending in a second direction crossing the first direction;

a defective line compensator configured to compensate for a sensing value of the defective line; and a defective pixel compensator configured to compensate for a sensing value of the defective pixel.

* * * * *